United States Patent [19]
Zakrzewski

[11] 3,955,438
[45] May 11, 1976

[54] EXTENSION HANDLE ASSEMBLY

[75] Inventor: Robert Zakrzewski, Franklin, Wis.

[73] Assignee: Outboard Marine Corporation, Waukegan, Ill.

[22] Filed: Nov. 4, 1974

[21] Appl. No.: 520,433

[52] U.S. Cl. .............................. 74/480 B; 74/485; 74/544; 74/551.8; 74/551.9; 115/18 R
[51] Int. Cl.² .............................. G01M 1/168
[58] Field of Search .............................. 74/480 B, 484, 485, 74/544, 551.8, 551.9; 115/18 R

[56] References Cited

UNITED STATES PATENTS

| | | | |
|---|---|---|---|
| 725,691 | 4/1903 | Fletcher | 74/551.9 |
| 778,573 | 12/1904 | Dunsford | 74/551.9 |
| 2,826,931 | 3/1958 | Michler | 74/484 |
| 2,903,903 | 9/1959 | Jaromy | 74/480 B X |
| 2,926,544 | 3/1960 | Carmichael, Jr. | 74/484 |
| 3,085,447 | 4/1963 | Shay | 74/480 B X |
| 3,228,415 | 1/1966 | Geiss | 74/544 X |

*Primary Examiner*—Willaim F. O'Dea
*Assistant Examiner*—Ronald C. Capossela
*Attorney, Agent, or Firm*—Michael, Best & Friedrich

[57] ABSTRACT

Disclosed herein is an auxiliary handle adapted to be removably attached to a rotatable part of an outboard motor steering handle for rotation of the steering handle part to control outboard motor engine operation and for lateral swinging movement of the steering handle to control outboard motor steering operation. The auxiliary handle comprises an attachment section adapted to be removably fixedly connected to the steering handle part for common rotation and lateral movement, together with an extension section, and a linkage connecting the extension section to the attachment section for effecting common rotary movement of the attachment section in response to rotation of the extension section, for effecting common lateral movement of the attachment section in response to lateral movement of the extension section, and for permitting movement of the extension section relative to the attachment section in response to application to the extension section of a force above a predetermined amount.

9 Claims, 5 Drawing Figures

Fig. 2

EXTENSION HANDLE ASSEMBLY

BACKGROUND OF THE INVENTION

The invention relates generally to outboard motors including steering handles which are laterally swingable to steer the outboard motor and which include a rotary handle part operably connected to the throttle to control engine speed and which can be connected to the transmission for control thereof in coordination with engine speed control. One example of such an outboard motor is disclosed in the U.S. Soder U.S. Pat. No. 2,906,251, issued Sept. 29, 1959.

More particularly, the invention relates to extension handles or auxiliary handles which are adapted for use with such outboard motors and which are removably connectable to such steering handles. One example of a prior auxiliary or extension handle is disclosed in the U.S. Carmichael U.S. Pat. No. 2,926,544, issued Mar. 1, 1960.

SUMMARY OF THE INVENTION

The invention provides an auxiliary or extension handle assembly adapted to be removably attached to the steering handle of an outboard motor for rotation of a part of the steering handle to control outboard motor engine operation and for lateral swinging movement of the steering handle for control of outboard motor steering operation. The auxiliary handle comprises an attachment section adapted to be removably fixedly connected to the steering handle part for rotation thereof in response to rotation of the attachment section and for lateral movement of the steering handle in response to lateral movement of the attachment section. The auxilary handle also includes an extension including a handle, and means connecting together the extension section and the attachment section for effecting rotary movement of the attachment section in response to rotation of the extension section, for effecting lateral movement of the attachment section in response to lateral movement of the extension section, and for permitting movement of the extension section relative to the attachment section in response to the application to the extension section of a force above a predetermined amount.

In one embodiment in accordance with the invention, the relative movement of the extension section relative to the attachment section can include both lateral movement and rotary movement.

In one embodiment in accordance with the invention, the connecting means comprises an annular serrated formation on the attachment section and a mating annular serrated formation on the extension section, together with means resiliently biasing together the attachment and extension sections so as to locate the serrated formations in intermeshing relationship.

Also in accordance with one embodiment of the invention, the connecting means functions to maintain the extension and attachment sections in alignment and further includes a central dome-shaped portion on one of the extension and attachment sections and a partially spherical recess portion on the other of the extension and attachment sections receiving the dome-shaped portion.

Also in a preferred embodiment in accordance with the invention, the attachment section includes a sleeve having an interior adapted to receive a portion of the steering handle part, together with a locking ring adapted to grip the steering handle part, a locking nut, means on the locking nut and on the sleeve for telescopically moving the nut and sleeve relative to each other in response to relative rotary movement therebetween, and means on the locking ring and on one of the nut and sleeve for clamping the locking ring between the steering handle part and the engaged one of the nut and the sleeve to fixedly connect the steering handle part to the attachment section.

One of the principal features of the invention is the provision of an auxiliary or extension handle which, in the event of the application thereto of excessive force, will resiliently flex or move relative to the steering handle.

Another of the principal features of the invention is the provision of an extension handle assembly including self-aligning attachment and extension sections.

Another of the principal features of the invention is the provision of an auxiliary handle which can be readily attached to and removed from the steering handle of an outboard motor.

Still another of the principal features of the invention is the provision of an extension handle which is economical to manufacture and which will provide reliable service over a long and useful life.

Other features and advantages of the invention will become known by reference to the following drawings, general description, and claims.

THE DRAWINGS

Figure 1:
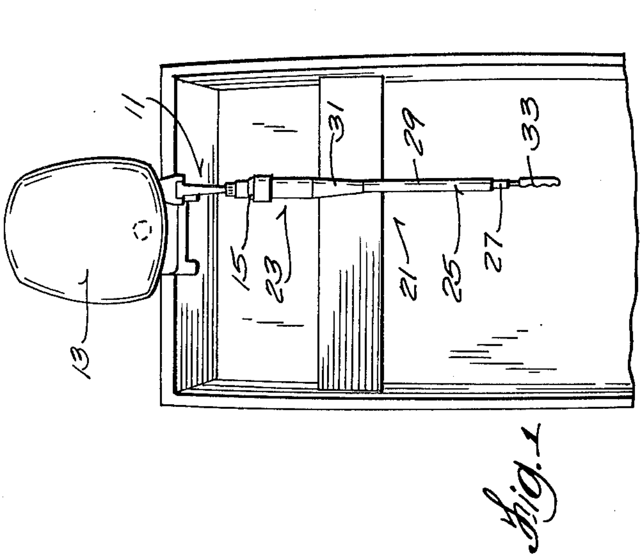
FIG. 1 is a fragmentary view of an outboard motor to which is assembled an auxiliary handle embodying various of the features of the invention.

Before explaining the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

GENERAL DESCRIPTION

Figure 2:
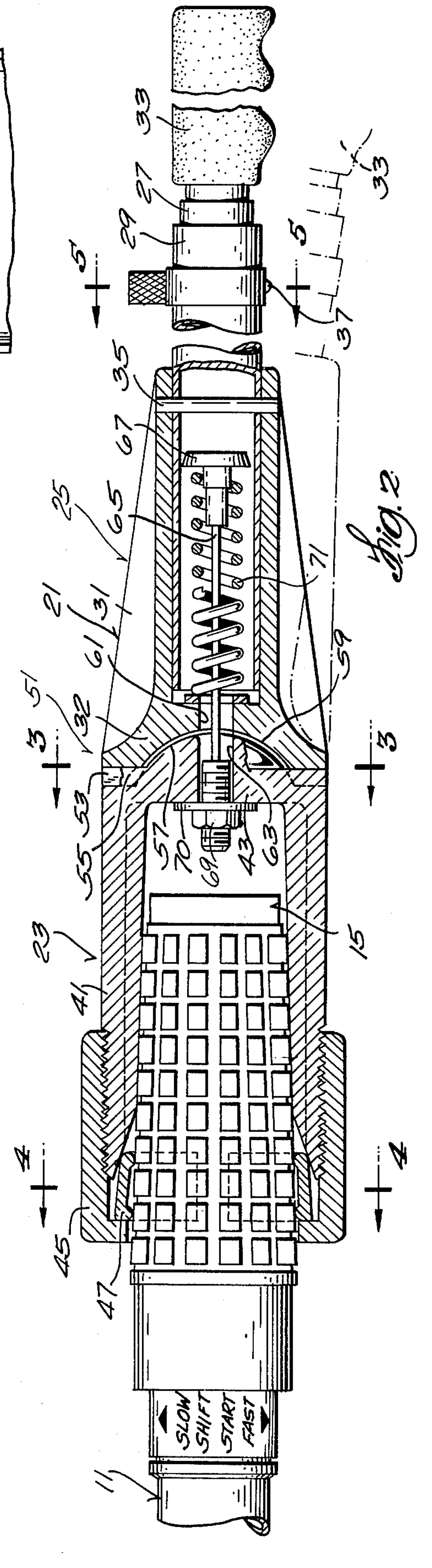
FIG. 2 is an enlarged fragmentary view, partially broken away and in section, of the auxiliary handle shown in FIG. 1.

Shown in the drawings in a steering handle 11 which can be bodily swung from side to side to effect steering of an outboard motor and which includes (See FIG. 2) a handle part 15 which is rotatably mounted on the steering handle 11 and which is rotatably connected to an engine throttle (not shown) so as to control engine speed. In addition, a linkage (not shown) can be provided to effect shifting of the engine in response to rotation of the handle part 15 and in coordination with engine speed control. Still further in addition, the steering handle 11 may be vertically swingable relative to the outboard motor 13 about a horizontal axis between a generally horizontal operating position and a generally vertical storage position.

Figure 5:
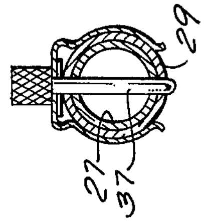
FIG. 5 is a view taken generally along line 5—5 of FIG. 2.
Figure 3:
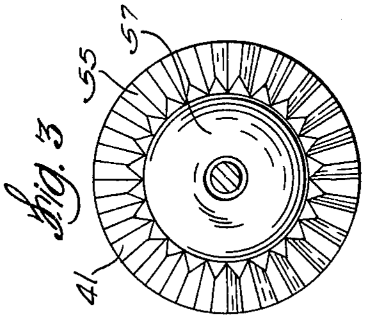
FIG. 3 is a view taken generally along line 3—3 of FIG. 2.
Figure 4:
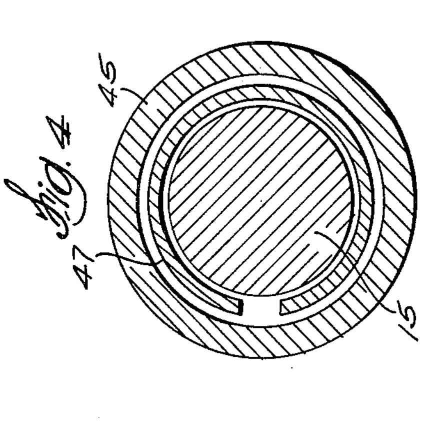
FIG. 4 is a view taken generally along line 4—4 of FIG. 2.

In accordance with the invention, there is provided and auxiliary or extension handle 21 which includes an attachment section 23 adapted to be removably fixed to the handle part 15 for common rotary movement to control engine speed and for common lateral movement to effect outboard motor steering. In addition, the extension handle 21 includes and extension section 25 which includes telescopically related inner and outer shafts 27 and 29, respectively, which shafts can be telescopically adjusted to vary the overall length thereof. In addition, the extension section 25 includes a base or member 31 which is attached to the inner end of the outer telescopic shaft 29 and which includes an end wall 32, together with a handle 33 which is fixed to the outer end of the inner telescopic shaft 27. A pin 35 or other suitable means connects the outer shaft 29 to the base or member 31 for common rotation. In addition, suitable means such as a removable pin 37 (See FIG. 5) can be employed to adjustably fix the telescopically related shafts 27 and 29 in selected adjusted relation so as to vary the length of the extension section 25.

The attachment section 23 includes a sleeve 41 having a hollow interior adapted to receive the handle part 15 of the outboard motor steering handle 11 and an end wall 43 closing the outer end of the sleeve 41. In order to retain the sleeve 41 on the handle part 15, the attachment section 23 also includes a nut 45 which is threaded onto a portion of the outer surface of the sleeve 41 to effect telescopic movement therebetween. In addition, the attachment section 23 includes means for fixedly connecting the attachment section 23 to the handle part 15 so as to provide common rotation and common lateral movement. While other arrangements are possible, in the illustrated construction, such means comprises a locking ring 47 which is preferable deformable, together with engagable means on the locking ring 47 and on one of the sleeve 41 and nut 45 for tightly engaging the locking ring 47 between the handle part 15 and the engaged one of the nut 45 and the sleeve 41 in response to telescopic movement between the nut 45 and the sleeve 41 and so that the locking ring 47 is tightly clamped between the handle part 15 and the attachment section 23 so as to effect common rotary and lateral movement.

As used herein, lateral movement is intended to be generic to movement in any plane extending radially of the axis of rotation of the handle part 15. When such lateral movement includes a horizontal component, such lateral movement is effective to cause steering of the outboard motor 13.

In addition, and in accordance with the invention, means 51 are provided for connecting the extension section 25 to the attachment section 23 for effecting rotary movement of the attachment section 23 in response to rotation of the extension section 25, for effecting lateral movement of the attachment section 23 in response to lateral movement of the extension section 25, and for permitting lateral movement of the extension section 25 relative to the attachment section 23 in response to the application to the extension section of a lateral force above a predetermined amount. Preferably, the connecting means also permits rotary movement of the extension section 25 relative to the attachment section 23 in response to application to the extension section 25 of a rotary force above a predetermined amount.

While various arrangements can be employed to connect the extension section 25 to the attachment section 23, in the illustrated construction, the connecting means 51 comprises construction of the end wall 32 of the base or member 31 of the extension section 25 and construction of the end wall 43 of the sleeve 41 of the attachment section 23 with respective annular serrated formations 53 and 55 which are intermeshed in order to afford transmission of rotary force from the extension section 25 to the attachment section 23. In order to keep the attachment and extension sections 23 and 25 in alignment, one of the end walls 32 and 43 includes a dome-shaped central portion 57 and the other of the end walls 32 and 43 includes a partially spherical recess portion 59 which receives the dome-shaped portion 57 so as to thereby maintain proper alignment between the attachment and extension sections 23 and 25.

The connecting means 51 also include means for yieldably biasing together the sleeve 41 and the base member 31. While various other constructions could be employed, in the illustrated construction, such means comprises, in each of the end walls 32 and 43, respective axially aligned bores 61 and 63, together with a member 65 which projects through the bores 61 and 63, which is preferably flexible, and which, at one end and within the interior of the base or member 31, includes an enlarged head 67 and which, at the other end and interiorly of the sleeve 41, is connected to an anchor in the form of an enlarged nut 69 and washer 70. The biasing means further includes a helical spring 71 which encircles the member 65 and, at one end, bears against the enlarged head 67 within the hollow interior of the base or member 31 and which, at the other end, bears against the margin surrounding the bore in the end wall 32 of the base or member 31. Thus, the sleeve 41 and base 31 are generally urged toward each other so that a rotary force applied to the extension section 25 will cause common rotation of the extension section 25 and the attachment section 23 and so that lateral force applied to the extension section 25 will also be applied to the attachment section 23 and therefore to the steering handle 11. However, the arrangement is such that in the event the laterally applied force exceeds a predetermined level, then the extension section 25 will pivot laterally (as shown in dotted outline in FIG. 2) against the action of the spring 71 and about an axis perpendicular to the rotary axis and located at the outer end of the serrated formations 53 and 55. Such excessive force could occur, for instance, if the operator fell on the extension handle 21.

Similarly, under normal loading, rotary movement of the extension section 25 will cause like movement of the attachment section 23 and connected handle part 15. However, application of excessive rotary force, as for instance when the throttle is already fully advanced, will cause ratcheting of the extension section 25 relative to the attachment section 23.

Various of the features of the invention are set forth in the following claims:

What is claimed is:

1. An auxiliary handle adapted to be removably attached to a rotatable part of an outboard motor steering handle for rotation of the steering handle part to control outboard motor engine operation and for lateral swinging movement of the steering handle to control outboard motor steering operation, said auxiliary handle comprising an attachment section adapted to be removably fixedly connected to the steering handle part for rotation of the steering handle part in response to rotation of said attachment section and for lateral movement of the steering handle in response to lateral movement of said attachment section, an extension section, and interengaging means on said extension section and on said attachment section for effecting common rotary movement of said attachment section in response to rotation of said extension section, and for effecting common lateral movement of said attachment section in response to lateral movement of said extension section, and for permitting movement of said extension section relative to said attachment section in response to application to said extension section of a force greater than the force resisting movement of said attachment section.

2. An auxiliary handle in accordance with claim 1 wherein said interengaging means serves to permit rotary and lateral movement of said extension section relative to said attachment section.

3. An auxiliary handle in accordance with claim 1 wherein said interengaging means includes an annular serrated formation on said attachment section and a mating annular serrated formation on said extension section, and means resiliently biasing said serrated formations into intermeshing relation.

4. An auxiliary handle in accordance with claim 3 wherein one of said attachment and extension sections includes, adjacent to the other of said sections, an end wall with a central dome-shaped portion, and wherein the other of said extension and attachment sections includes, adjacent to said one section, an end wall with a partially spherical recess portion matingly receiving said dome-shaped portion.

5. An auxiliary handle in accordance with claim 3 wherein said attachment section is tubular and includes, adjacent to said extension section, an end wall having therein an axial bore, wherein said extension section is tubular and includes, adjacent to said attachment section, an end wall having therein an axial bore, and wherein said resilient biasing means extends, in part, through said axial bores.

6. An auxiliary handle in accordance with claim 5 wherein said resilient biasing means includes a member extending through said bores and including an enlarged head at one end thereof within one of said sections, anchor means at the other end of said member preventing withdrawal of said member through said bore of the other of said sections, and spring means biasing said enlarged head away from said other of said sections.

7. An auxiliary handle in accordance with claim 6 wherein said member is flexible.

8. An auxiliary handle in accordance with claim 6 wherein said spring encircles said member and is seated, at one end, against said enlarged head, and is seated, at the other end, against said extension section end wall.

9. An auxiliary handle in accordance with claim 1 wherein said attachment section includes a sleeve having an interior adapted to receive a portion of the handle part, a locking ring adapted to grip said handle part, a locking nut, thread means on said nut and said sleeve for telescopically moving said nut and said sleeve relative to each other in response to relative rotation therebetween, and means on said locking ring and one of said nut and said sleeve for clamping said ring between the handle part and the engaged one of said nut and said sleeve to fixedly connect said attachment section to the handle part.

* * * * *